(12) United States Patent
Ma et al.

(10) Patent No.: US 12,157,417 B2
(45) Date of Patent: Dec. 3, 2024

(54) CAMERA MONITOR SYSTEM INCLUDING INTEGRATED RANGE SENSOR

(71) Applicant: Stoneridge Electronics AB, Solna (SE)

(72) Inventors: Liang Ma, Rochester, MI (US); Troy Otis Cooprider, White Lake, MI (US); Dominik Marx, Novi, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 92 days.

(21) Appl. No.: 18/085,631

(22) Filed: Dec. 21, 2022

(65) Prior Publication Data
US 2023/0202395 A1   Jun. 29, 2023

Related U.S. Application Data
(60) Provisional application No. 63/293,188, filed on Dec. 23, 2021.

(51) Int. Cl.
*B60R 1/26* (2022.01)
*G01S 13/86* (2006.01)
(Continued)

(52) U.S. Cl.
CPC .............. *B60R 1/26* (2022.01); *G01S 13/867* (2013.01); *G01S 13/931* (2013.01); *G06T 7/20* (2013.01);
(Continued)

(58) Field of Classification Search
CPC .............. B60R 1/26; B60R 2300/8046; B60R 2300/8066; G06T 7/70; G06T 7/20;
(Continued)

(56) References Cited

U.S. PATENT DOCUMENTS
2020/0327345 A1* 10/2020 Schumacher ............ G06N 3/08
2020/0349779 A1* 11/2020 Schumacher .......... G07C 5/085
(Continued)

FOREIGN PATENT DOCUMENTS
| | | |
|---|---|---|
| DE | 102020123920 B3 | 8/2021 |
| WO | 2021132259 A1 | 7/2021 |
| WO | 2021137964 A1 | 7/2021 |

OTHER PUBLICATIONS
International Search Report and Written Opinion for International Application No. PCT/US2022/053578 mailed May 3, 2023.
(Continued)

*Primary Examiner* — Christopher S Kelley
*Assistant Examiner* — Asmamaw G Tarko
(74) *Attorney, Agent, or Firm* — Carlson, Gaskey & Olds, P.C.

(57) ABSTRACT

A camera monitor system including a first mirror replacement assembly including a housing supporting a rear facing camera and a rear facing range sensor, a controller in communication with the mirror replacement assembly, the controller including a processor and a memory, the memory storing instructions for identifying at least one object in an image feed from the camera and determining an angular position of the object using image analysis, identifying a distance of the at least one object from the mirror replacement assembly using the range sensor; and fusing the distance and the angular position of the object into a single data set, and a display connected to the controller and configured to display a mirror replacement view including at least a portion of the image feed.

18 Claims, 6 Drawing Sheets

(51) Int. Cl.
   *G01S 13/931* (2020.01)
   *G06T 7/20* (2017.01)
   *G06T 7/70* (2017.01)
   *H04N 7/18* (2006.01)

(52) U.S. Cl.
   CPC .............. *G06T 7/70* (2017.01); *H04N 7/181* (2013.01); *B60R 2300/8046* (2013.01); *B60R 2300/8066* (2013.01); *G01S 2013/9323* (2020.01); *G01S 2013/93274* (2020.01); *G06T 2207/30232* (2013.01); *G06T 2207/30252* (2013.01)

(58) Field of Classification Search
   CPC . G06T 2207/30232; G06T 2207/30252; G01S 13/867; G01S 13/931; G01S 2013/9323; G01S 2013/93274; H04N 7/181
   USPC .......................................................... 348/148
   See application file for complete search history.

(56) References Cited

U.S. PATENT DOCUMENTS

| | | | |
|---|---|---|---|
| 2021/0174103 A1* | 6/2021 | Schumacher | G06F 18/22 |
| 2022/0024316 A1* | 1/2022 | Suzuki | B60K 35/60 |
| 2022/0083841 A1* | 3/2022 | Isele | G01S 7/4808 |
| 2022/0299649 A1* | 9/2022 | Bhat | G01S 7/51 |
| 2023/0085898 A1* | 3/2023 | Dijkman | G01S 7/2955 |
| | | | 702/97 |
| 2023/0242132 A1* | 8/2023 | Boka | B60W 50/0205 |
| | | | 701/29.7 |

OTHER PUBLICATIONS

International Preliminary Report on Patentability for International Application No. PCT/US2022/053578 mailed Mar. 5, 2024.

* cited by examiner

CAMERA MONITOR SYSTEM INCLUDING INTEGRATED RANGE SENSOR

CROSS-REFERENCE TO RELATED APPLICATION

This application claims priority to U.S. Provisional Patent Application No. 63/293,188 filed on Dec. 23, 2021.

TECHNICAL FIELD

This disclosure relates to a camera monitor system (CMS) for use in a commercial truck, and more specifically a camera monitor system including an integrated range sensor.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the mirror replacement systems cover a larger field of view than a conventional mirror, or include views that are not fully obtainable via a conventional mirror.

Camera monitor systems utilize object detection and image analysis systems to identify objects within the image feeds from the mirror replacement cameras. The image analysis can further be used to determine information about the object, and that information can be provided to a vehicle controller for use with automated or semi-automated driver assist systems, driver warning systems, and any other similar systems on a vehicle.

SUMMARY OF THE INVENTION

In one exemplary embodiment a camera monitor system includes a first mirror replacement assembly including a housing supporting a rear facing camera and a rear facing range sensor, a controller in communication with the mirror replacement assembly, the controller including a processor and a memory, the memory storing instructions for identifying at least one object in an image feed from the camera and determining an angular position of the object using image analysis, identifying a distance of the at least one object from the mirror replacement assembly using the range sensor; and fusing the distance and the angular position of the object into a single data set, and a display connected to the controller and configured to display a mirror replacement view including at least a portion of the image feed.

In another example of the above described camera monitor system the range sensor is a time of flight sensor.

In another example of any of the above described camera monitor systems the time of flight sensor includes a radar sensor.

In another example of any of the above described camera monitor systems the time of flight sensor includes a lidar range sensor.

In another example of any of the above described camera monitor systems the controller is further configured to determine a speed of the identified object using the range sensor.

In another example of any of the above described camera monitor systems the controller is further configured to communicate the combined angular position and range to at least one advanced driver assistance system.

In another example of any of the above described camera monitor systems the first mirror replacement assembly is disposed in a first camera wing of a commercial vehicle.

Another example of any of the above described camera monitor systems further includes a second mirror replacement assembly approximately identical to the first mirror replacement assembly.

In another example of any of the above described camera monitor systems the first mirror replacement assembly is disposed on a driver side of the vehicle, and wherein the second mirror replacement assembly is disposed on a passenger side of the vehicle.

In another example of any of the above described camera monitor systems the controller is configured to fuse the distance and the angular position of the object into the single data set using a nearest neighbor matching algorithm.

In another example of any of the above described camera monitor systems the nearest neighbor matching algorithm is configured to correlate the angular position of the at least one object and the distance of the at least one object to a tracking object within a maximum cost number of the at least one object.

In another example of any of the above described camera monitor systems the maximum cost number is a weighted sum of range difference, velocity difference and angle difference between the at least one object and the tracking object.

An exemplary method for improving object detection in a mirror replacement system includes a controller receiving at least one object detection from a rear facing time of flight sensor in a vehicle wing, the controller receiving image data from a rear facing camera within the wing and identifying the at least one object in the image data using an image analysis process, and fusing an angular position of the at least one object from the image data with at least a distance from the time of flight sensor to generate a fused tracking object.

In another example of the above described method for improving object detection in a mirror replacement system the time of flight sensor is one of a radar sensor and a lidar sensor.

In another example of any of the above described methods for improving object detection in a mirror replacement system fusing the angular position of the at least one object from the image data with the at least the distance from the time of flight sensor to generate the fused tracking object includes fusing object speed data from the time of flight sensor.

In another example of any of the above described methods for improving object detection in a mirror replacement system fusing the angular position of the at least one object from the image data with the at least the distance from the time of flight sensor is performed by the controller using a nearest neighbor matching algorithm.

In another example of any of the above described methods for improving object detection in a mirror replacement system the nearest neighbor matching algorithm is configured to correlate the angular position of the at least one object and the distance of the at least one object to a tracking object within a maximum cost number of the at least one object.

In another example of any of the above described methods for improving object detection in a mirror replacement system the maximum cost number is a weighted sum of range difference, velocity difference and angle difference between the at least one object and the tracking object.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
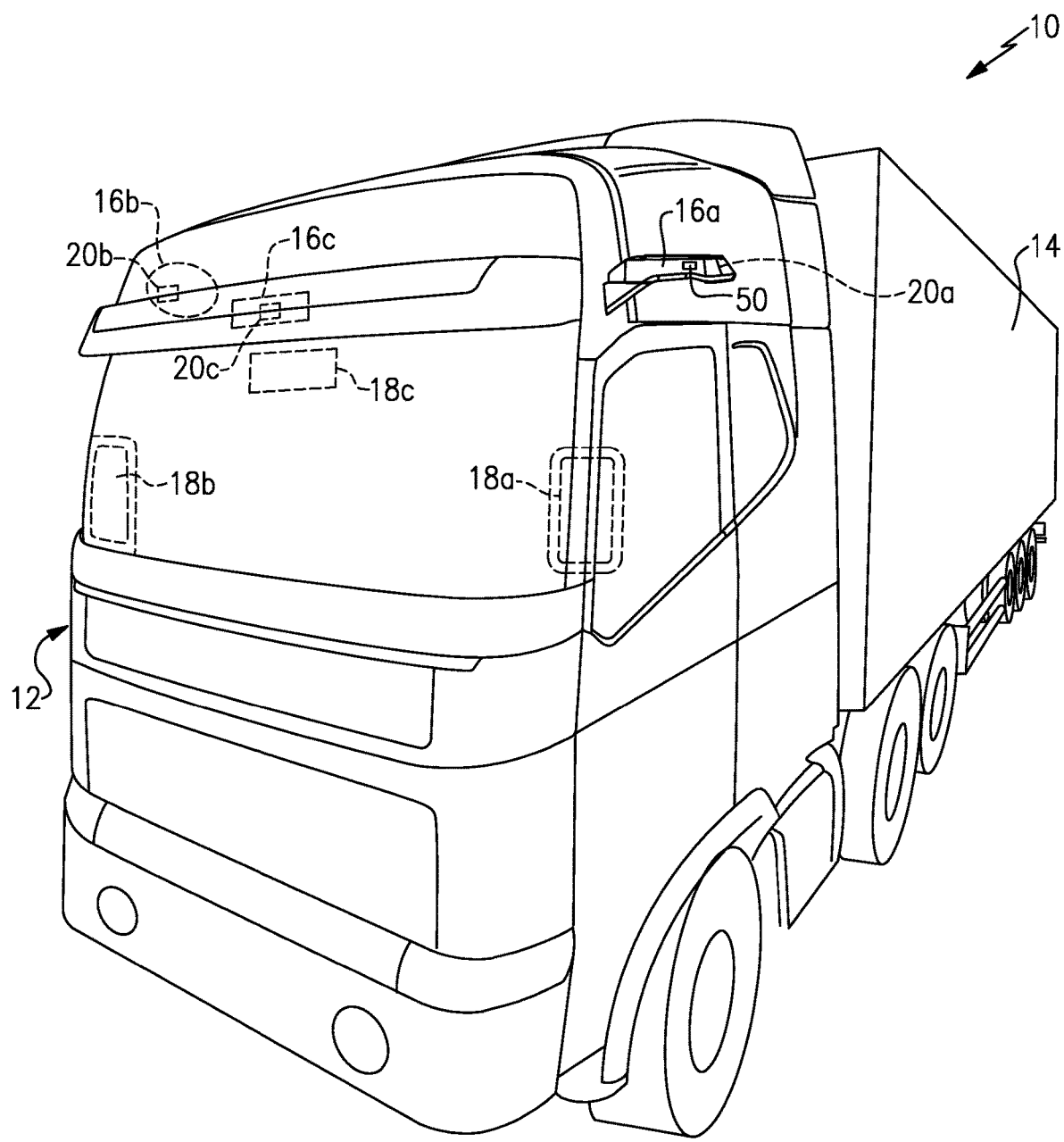
FIG. 1A is a schematic front view of a commercial truck with a camera monitor system (CMS) used to provide at least Class II and Class IV views.
Figure 1B:
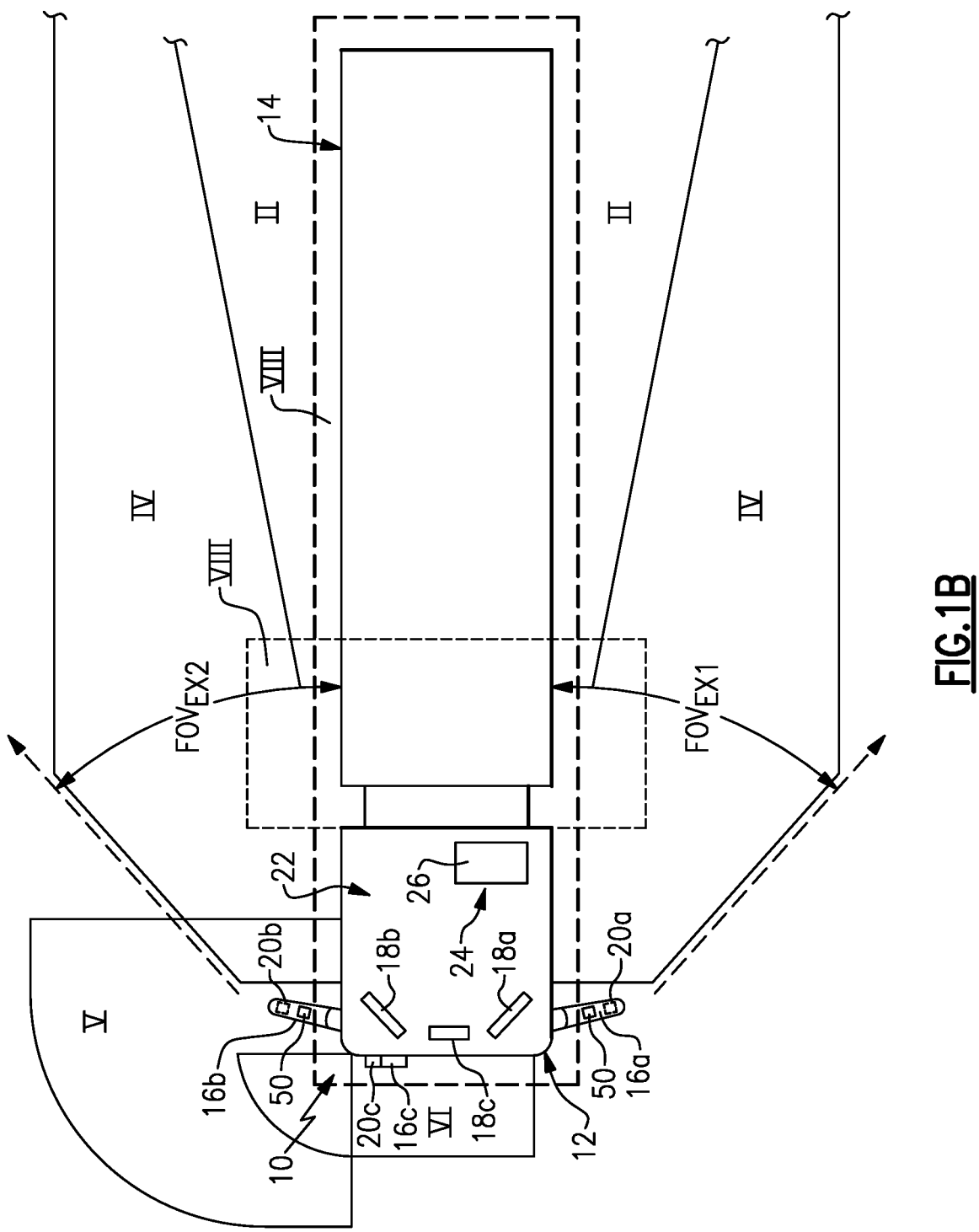
FIG. 1B is a schematic top elevational view of a commercial truck with a camera monitor system providing Class II, Class IV, Class V and Class VI views.
Figure 2:
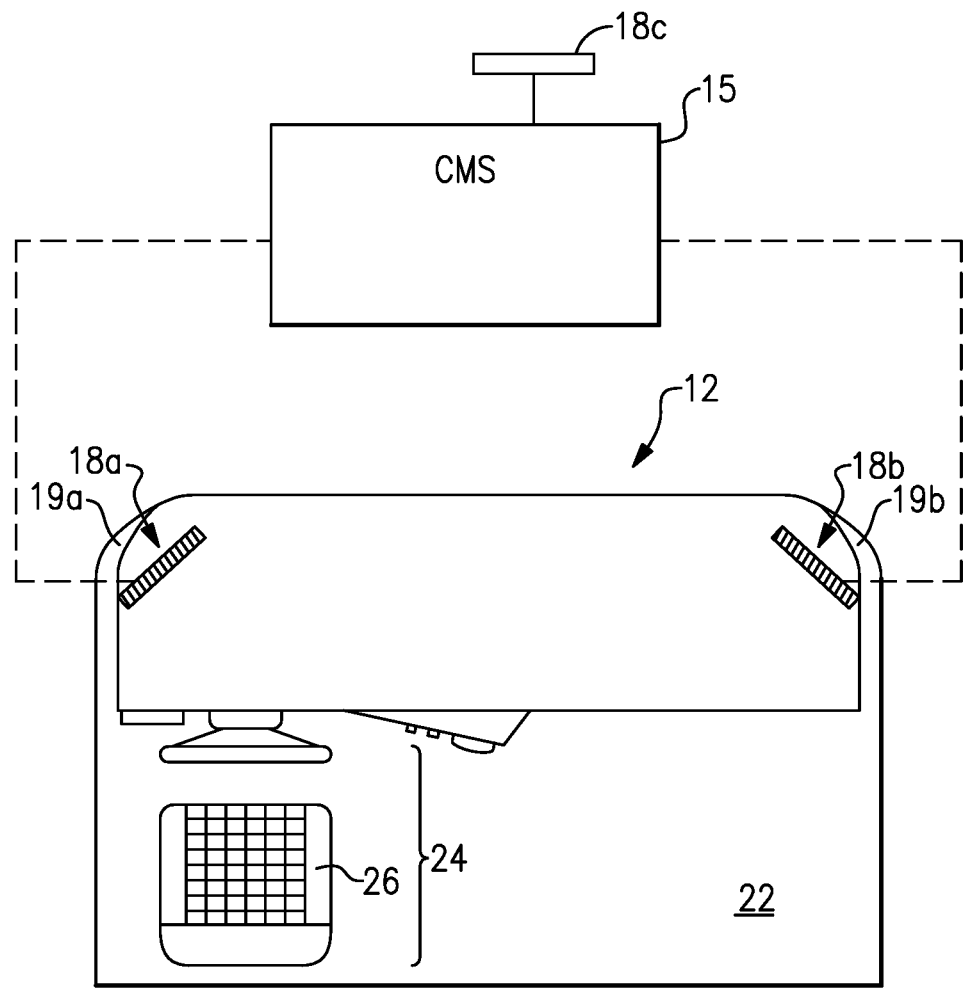
FIG. 2 is a schematic top perspective view of an vehicle cabin including displays and interior cameras.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{Ex1}$, $FOV_{Ex2}$ that each include at least one of the Class II and Class IV views (FIG. 1B), which are legal prescribed views in the commercial trucking industry. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of class VIII views is desired, camera housings can be disposed at the sides and rear of the vehicle 10 to provide fields of view including some or all of the class VIII zones of the vehicle 10. As illustrated, the Class VIII view includes views immediately surrounding the trailer, and in the rear proximity of the vehicle including the rear of the trailer. In one example, a view of the rear proximity of the vehicle is generated by a rear facing camera disposed at the rear of the vehicle, and can include both the immediate rear proximity and a traditional rear view (e.g. a view extending rearward to the horizon, as may be generated by a rear view mirror in vehicles without a trailer). In such examples, the third display 18c can include one or more frames displaying the class VIII views. Alternatively, additional displays can be added near the first, second and third displays 18a, 18b, 18c and provide a display dedicated to providing a class VIII view. The displays 18a, 18b, 18c face a driver region 24 within the cabin 22 where an operator is seated on a driver seat 26.

Also included in each of the camera arms 16a, 16b is a mirror replacement assembly that includes a range sensor 50, such as a radar sensor, a lidar sensor, or any other time of flight sensor, and a corresponding camera 20a, 20b. The range sensor 50 and the camera 20a, 20b are rear facing, with field of views at least as large as the field of view provided by a convention rear facing mirror as seen by an occupant in the driver position. Each camera arm 16a, 16b includes an approximately identical mirror replacement assembly. As used herein, approximately identical mirror replacement assemblies refer to mirror replacement assemblies that have the same systems and functionality, while allowing for minor variations such as orientation and relative positioning that may be necessary to account for driver side/passenger side positioning or similar position related variations.

The range sensor 50 emits waves of radio (radar) or light (lidar) that reflect off objects and back to the range sensor 50. The range sensor 50 measures the time of flight from emission to the wave being returned to the sensor. Based on this time of flight, the range sensor 50, or a connected controller, can detect the distance that an object is from the range sensor 50. Due to the way in which the range sensor 50 operates, a distance to an object and a rate of change of that distance relative to the sensor (i.e. a velocity of the object) can be determined quickly, and with a high degree of accuracy, using the sensor signals and minimal calculations. While the range sensor 50 is able to identify a distance of the object from the range sensor 50, the angular position of the object is relatively difficult to determine based on sensor signals alone.

Figure 3A:
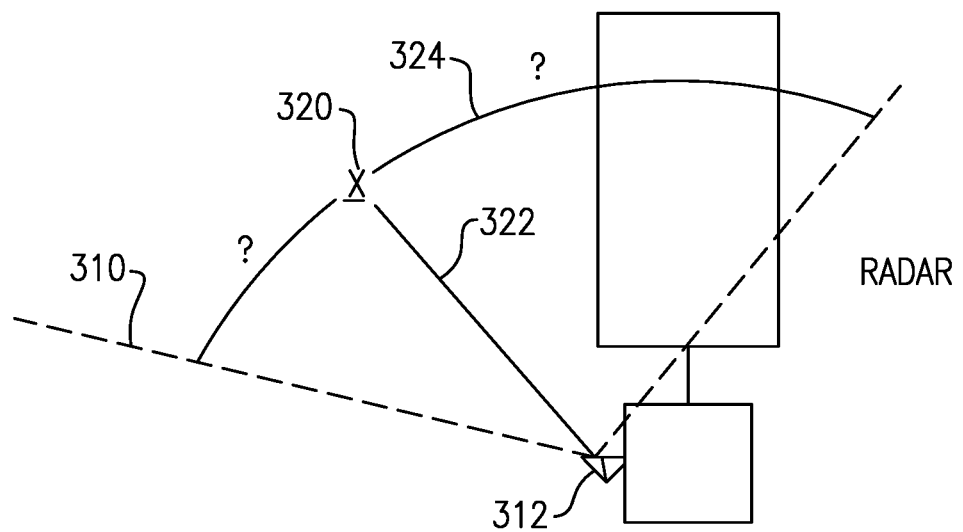
FIG. 3A illustrates a range sensor field of view for a commercial vehicle.

FIG. 3A schematically illustrates a field of view 310 generated by a range sensor 312. An object 320 is positioned within the field of view 310 and detected by the range sensor 312. A distance 322 of the object 320 to the range sensor 312 can be determined relatively easily from the data generated by the range sensor 312 alone. However, a precise angular position is difficult or impossible to determine from the range sensor 312 data alone. The angular position is a position on an arc 324 around the range sensor 312, with the arc 324 having a radius equal to the detected distance 320. While only a single object 320 is depicted in the example of FIG. 3A for ease of explanation, it is appreciated that the range sensor 312 can identify distances from the range sensor 312 to multiple distinct objects 320, as well as approximate corresponding angular positions, distributed about the field of view 310 within a single sensing operation and this detection can be achieved using conventional techniques.

In addition to the range sensor 312 detection, a controller within the CMS 15 uses object detection analysis on the image feeds from cameras in the mirror replacement assemblies to identify objects. With continued reference to FIGS. 1-3A, FIG. 3B schematically illustrates an object detection using the image based analysis on the CMS controller. Initially the CMS analyzes an image in the field of view 410 of the camera 412 and identifies an object 402 using conventional object identification techniques that can be either rule based, neural network based, or a combination of rule and neural network based. After identifying the object, the image analysis process further detects an angular position 422 of the object 402, relative to the camera 412 and can assist in differentiating between multiple detected objects. Unlike the range sensor example of FIG. 3A, the image based analysis has difficulty determining the precise distance between the object 402 and the camera 412, and consequently has difficulty determining a change in the distance, while at the same time being well suited for determining the precise angular position of the object.

Figure 3B:
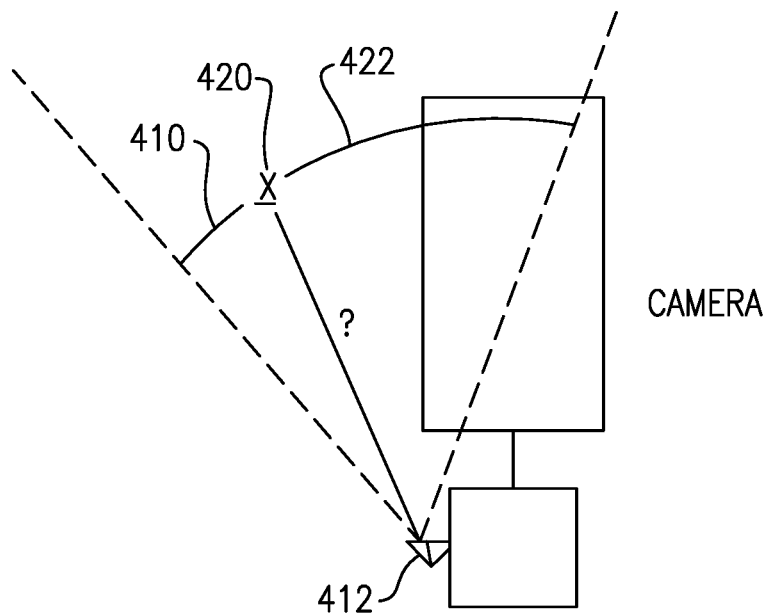
FIG. 3B illustrates a camera field of view for a commercial vehicle.
Figure 4:
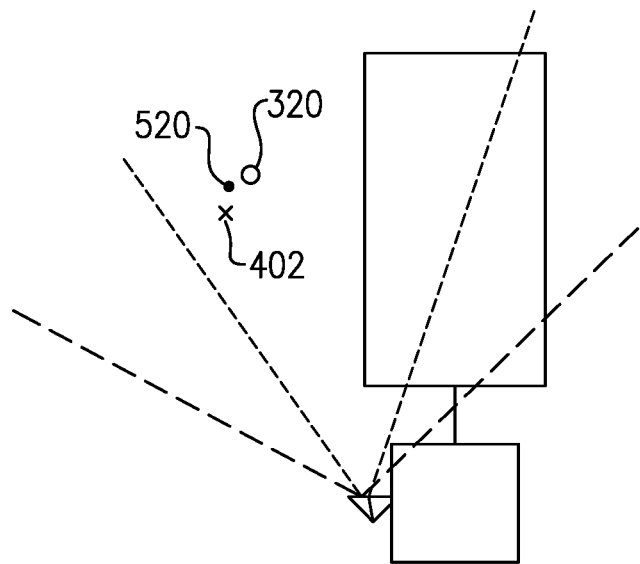
FIG. 4 schematically illustrates a nearest neighbor fusion of the sensor field of view of FIG. 3A and the camera field of view of FIG. 3B.

With continued reference to FIGS. 3A and 3B, FIG. 4 schematically illustrates a fusion of the range data from FIG. 3A and the angular position data from FIG. 3B using a nearest neighbor matching fusion technique to combine the range data and the angular position data for each object detected. In alternative examples, alternative fusion techniques (E.g., Hungarian algorithm) can be used. The nearest neighbor matching method identifies the detected position of the radar object 320 and the detected position of the image based detection object 402. In addition to the detected positions, at least one tracking object 520 is stored within the controller operating the fusion algorithm. The tracking object 520 includes a last known fused distance and angular position of the tracking object 520.

Figure 6:
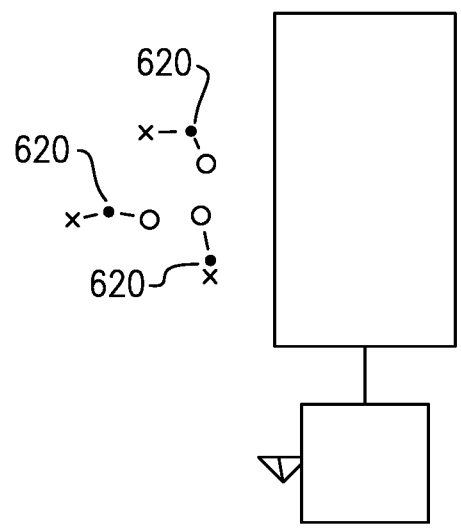
FIG. 6 schematically illustrates an example nearest neighbor matching of multiple tracked objects.

Each radar object 320 and each image detection object 402 is correlated with the closest tracking object 520 as the "nearest neighbor". When both a radar object 320 and an image detection object 402 are correlated with a single tracking object 520, the tracking object 520 updates the distance and angular position data such that the distance data of the radar object 320 and the angular position data of the image detection object 402 become the new distance and angular position data for the tracking object 520. In some examples, such as that of FIG. 6, multiple tracking objects 620 can be utilized to fuse multiple object detections. While illustrated in the example of FIG. 6 as including three tracking objects 620, it is appreciated that any number of tracking objects can be utilized.

When no tracking object 520 is within a maximum cost number of a pair of radar objects 320 and image based detection objects 420, a new tracking object 520 is created using the angular position from the image based detection object 402 and the distance from the radar object 320. The maximum cost number is a weighted sum of range difference, velocity difference and angle difference between the at least one object and the tracking and object ensures that the nearest tracking object is not correlated with a different object.

When a tracking object 520 is the nearest tracking object for multiple detections of the same type (e.g. a single tracking object 520 is the nearest tracking object 520 for two separate radar detections 320) the tracking object 520 is correlated with the nearest of the two separate radar detections 320 and the other radar detection 320 is paired with its second closest tracking object 520.

In some exemplary systems, where computational power is at a premium, the number of available tracking objects 520 can be limited to at most 16 tracking objects. In such a case, radar and image based object detections that are beyond a predetermined distance from the vehicle are ignored. In addition to providing a fused position of the tracking object 520, the fused data can, in some examples, include historical data providing a position history and allow for motion of the tracking object 520 to be followed.

Figure 5:
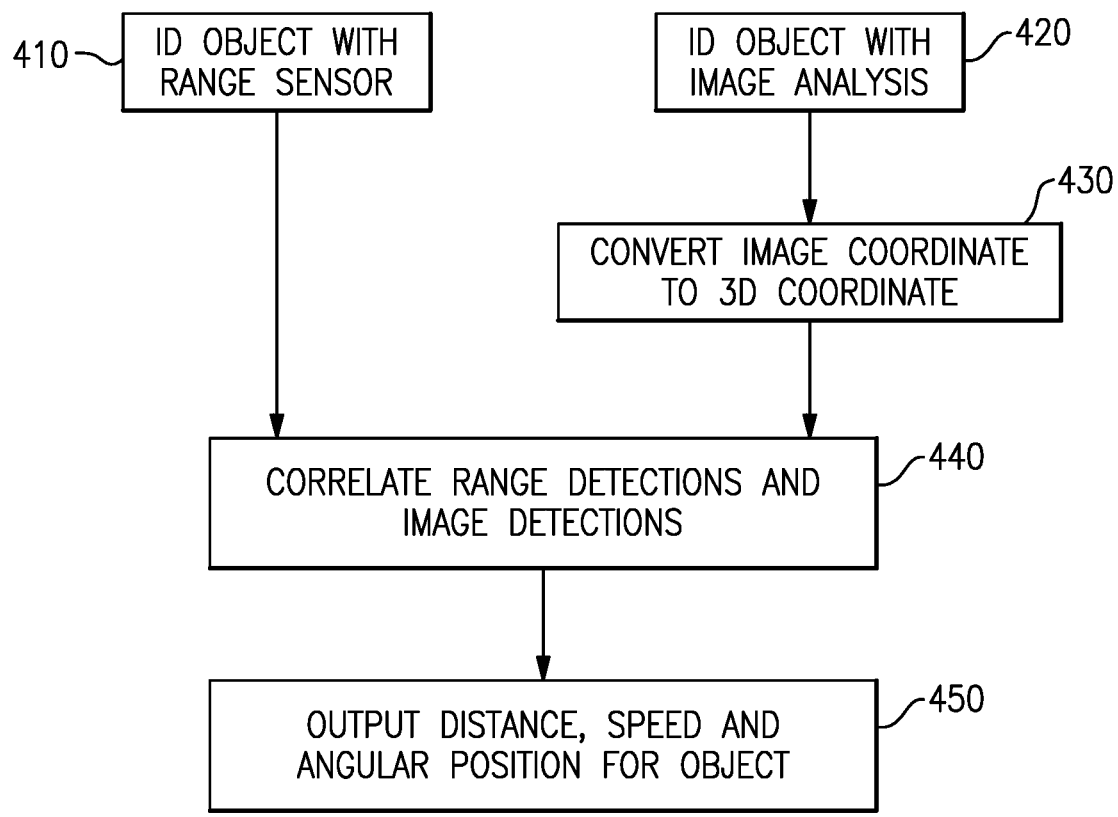
FIG. 5 illustrates a process for fusing sensor and camera based object detections from a single mirror replacement assembly.

With continued reference to FIGS. 3A and 3B, FIG. 5 illustrates a flowchart showing the method for fusing the data from each of the range sensor 312 and the camera 412, thereby identifying a distance, velocity and position of each identified object. Initially, objects are identified with the range sensor 312 in an "ID Object with Range Sensor" step 410 and objects are simultaneously identified based on image analysis in an "ID Object with Image Analysis" step 420. Objects identified using the image based analysis of step 420 are converted from a two dimensional position within the image to an at least partially three dimensional position relative to the camera 412 in a "Convert Image Coordinates to 3D coordinates" step 430.

After converting the image coordinates to 3D coordinates, the controller correlates the range detection from the range sensor 312 and the image detection from the camera 412 in a "Correlate Range Detections and Image Detections" step 440. In one example the correlation is achieved using the nearest neighbor matching methodology as described above. The correlation provides a one to one mapping of each object identified by the image analysis to each object identified by the range sensor 312 using the tracking objects 520. As the tracking objects 520 track the fused data, they can alternately be referred to as fusion objects.

Once combined by the fusion algorithm, a distance, relative speed, and angular position for the object is output by the process in an "Output Distance, Speed and Angular Position for Object" step 450. In some examples, the information is output from the controller to a distinct vehicle system through a vehicle communication bus (such as a CAN Bus). In other examples, the information is output from the process to one or more additional processes within the CMS controller. By way of example, the distance and angular position of a given object may be used by the CMS controller to generate human machine interface elements to be displayed to a vehicle operator, determine positioning of range based indicators within a mirror replacement display, and the like. In alternative examples, the information can be provided to an advanced driver assistance system (ADAS) such as a blind spot alert, a lane change assist, rear cross traffic alert, or any similar system.

By positioning the range sensor 50 within a housing in the camera arms 16a, 16b, an orienting the field of view of the range sensors 50 and the cameras 20a, 20b in the same rearward direction, the CMS controller can utilize the fusion algorithm to achieve highly accurate data regarding objects detected at the side of, and the rear of, a commercial vehicle. Further, while discussed above with regards to individual objects, it is understood that multiple distinct object can be detected and analyzed using the disclosed system and process simultaneously, without requiring additional modifications.

In addition to improving the ability to fuse data using the fusion algorithm by placing the range sensor 312 and the camera 412 in approximately the same location, inclusion of the range sensor within the camera wing 16a, 16b allows a single heater to provide de-icing for both the camera 412 and the range sensor 312. Further, inclusion of both within the same housing allows a single alignment system to be utilized to maintain the alignment of the camera 412 and the range sensor 312.

Although an example embodiment has been disclosed, a worker of ordinary skill in this art would recognize that certain modifications would come within the scope of the claims. For that reason, the following claims should be studied to determine their true scope and content.

What is claimed is:

1. A camera monitor system comprising:
   a first mirror replacement assembly including a housing supporting a rear facing camera and a rear facing range sensor;
   a controller in communication with the mirror replacement assembly, the controller including a processor and a memory, the memory storing instructions for identifying at least one object in an image feed from the camera and determining an angular position of the object using image analysis, identifying a distance of the at least one object from the mirror replacement assembly using the range sensor; and fusing the distance and the angular position of the object into a single data set, wherein the controller is configured to fuse the distance and the angular position of the object into the single data set using a Hungarian algorithm; and
   a display connected to the controller and configured to display a mirror replacement view including at least a portion of the image feed.

2. A camera monitor system for a vehicle comprising:
   a first mirror replacement assembly including a housing supporting a rear facing camera and a rear facing range sensor;
   a controller in communication with the mirror replacement assembly, the controller including a processor and a memory, the memory storing instructions for identifying at least one object in an image feed from the camera and determining an angular position of the object using image analysis, identifying a distance of the at least one object from the mirror replacement assembly using the range sensor; and fusing the distance and the angular position of the object into a single data set, wherein the controller is configured to fuse the distance and the angular position of the object into the single data set using a nearest neighbor matching algorithm; and
   a display connected to the controller and configured to display a mirror replacement view including at least a portion of the image feed.

3. The camera monitor system of claim 2, wherein the range sensor is a time of flight sensor.

4. The camera monitor system of claim 3, wherein the time of flight sensor includes a radar sensor.

5. The camera monitor system of claim 3, wherein the time of flight sensor includes a lidar range sensor.

6. The camera monitor system of claim 2, wherein the controller is further configured to determine a speed of the identified object using the range sensor.

7. The camera monitor system of claim 2, wherein the controller is further configured to communicate the combined angular position and range to at least one advanced driver assistance system.

8. The camera monitor system of claim 2, wherein the first mirror replacement assembly is disposed in a first camera wing of a commercial vehicle.

9. The camera monitor system of claim 2, further comprising a second mirror replacement assembly approximately identical to the first mirror replacement assembly.

10. The camera monitor system of claim 9, wherein the first mirror replacement assembly is disposed on a driver side of the vehicle, and wherein the second mirror replacement assembly is disposed on a passenger side of the vehicle.

11. The camera monitor system of claim 2, wherein the nearest neighbor matching algorithm is configured to correlate the angular position of the at least one object and the distance of the at least one object to a tracking object within a maximum cost number of the at least one object.

12. The camera monitor system of claim 11, wherein the maximum cost number is a weighted sum of range difference, velocity difference and angle difference between the at least one object and the tracking object.

13. A method for improving object detection in a mirror replacement system comprising:
    a controller receiving at least one object detection from a rear facing time of flight sensor in a vehicle wing;
    the controller receiving image data from a rear facing camera within the wing and identifying the at least one object in the image data using an image analysis process; and
    fusing an angular position of the at least one object from the image data with at least a distance from the time of flight sensor to generate a fused tracking object, wherein fusing the angular position of the at least one object from the image data with the at least the distance from the time of flight sensor is performed by the controller using a Hungarian algorithm.

14. A method for improving object detection in a mirror replacement system comprising:
    a controller receiving at least one object detection from a rear facing time of flight sensor in a vehicle wing;
    the controller receiving image data from a rear facing camera within the wing and identifying the at least one object in the image data using an image analysis process; and
    fusing an angular position of the at least one object from the image data with at least a distance from the time of flight sensor to generate a fused tracking object, wherein fusing the angular position of the at least one object from the image data with the at least the distance from the time of flight sensor is performed by the controller using a nearest neighbor matching algorithm.

15. The method of claim 14, wherein the time of flight sensor is one of a radar sensor and a lidar sensor.

16. The method of claim 14, wherein fusing the angular position of the at least one object from the image data with the at least the distance from the time of flight sensor to generate the fused tracking object includes fusing object speed data from the time of flight sensor.

17. The method of claim 14, wherein the nearest neighbor matching algorithm is configured to correlate the angular position of the at least one object and the distance of the at least one object to a tracking object within a maximum cost number of the at least one object.

18. The method of claim 17, wherein the maximum cost number is a weighted sum of range difference, velocity difference and angle difference between the at least one object and the tracking object.

\* \* \* \* \*